United States Patent
Olsson et al.

(10) Patent No.: US 8,515,465 B2
(45) Date of Patent: Aug. 20, 2013

(54) SOLUTION FOR PAGING DIFFERENTIATION IN COMMUNICATION NETWORK

(75) Inventors: Lasse Olsson, Stenungsund (SE); Anders Freden, Kullavik (SE); Klas Hjelmgren, Vastra Frolunda (SE)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 0 days.

(21) Appl. No.: 13/393,736

(22) PCT Filed: Jun. 8, 2010

(86) PCT No.: PCT/EP2010/058009
§ 371 (c)(1),
(2), (4) Date: Mar. 1, 2012

(87) PCT Pub. No.: WO2011/026663
PCT Pub. Date: Mar. 10, 2011

(65) Prior Publication Data
US 2012/0157132 A1     Jun. 21, 2012

Related U.S. Application Data

(60) Provisional application No. 61/239,300, filed on Sep. 2, 2009.

(51) Int. Cl.
*H04W 68/00* (2009.01)
*H04W 4/00* (2009.01)
*H04W 40/00* (2009.01)
*H04H 20/71* (2008.01)

(52) U.S. Cl.
USPC ..... 455/458; 455/435.1; 455/445; 455/422.1; 370/332; 370/312; 370/328

(58) Field of Classification Search
USPC .......................................... 455/458
See application file for complete search history.

(56) References Cited

U.S. PATENT DOCUMENTS

| | | | |
|---|---|---|---|
| 2004/0248577 A1* | 12/2004 | Sayeedi | 455/445 |
| 2006/0052117 A1* | 3/2006 | Katsube et al. | 455/458 |
| 2009/0003285 A1* | 1/2009 | Mohanty et al. | 370/332 |

(Continued)

FOREIGN PATENT DOCUMENTS
WO    2008084287 A1    7/2008

OTHER PUBLICATIONS

3GPP TS 23.401 V8.6.0 Release 8 (LTE; General Packet Radion Service (GPRS) enhancements for Evolved Universal Terrestrial Radio Access Network (E-UTRAN) access); (Jun. 2009).*

(Continued)

*Primary Examiner* — Timothy Pham
(74) *Attorney, Agent, or Firm* — Rothwell, Figg, Ernst & Manbeck, P.C.

(57) ABSTRACT

The present invention relates to a solution for paging of idle user equipment and in particular for changing mode status from idle to connected in an efficient manner. This is provided in a method, nodes, and a system arranged to determine a suitable paging message related to a framework table indicating selection criteria entries for access point name, quality of service class indicator, IMSI number, and IMEI number and determining from the framework table a paging granularity set to be used in the paging request from a granularity table comprising entries for paging areas, number of paging retries, and time between retransmissions.

9 Claims, 3 Drawing Sheets

(56) References Cited

U.S. PATENT DOCUMENTS

2009/0318147 A1* 12/2009 Zhang et al. ............... 455/435.1
2010/0022256 A1* 1/2010 Hochedez .................... 455/458
2010/0128646 A1* 5/2010 Gao ............................. 370/312

OTHER PUBLICATIONS

"Universal Mobile Telecommunications System (UMTS); LTE; 3GPP Evolved Packet System (EPS); Evolved General Packet Radio Service (GPRS) Tunnelling Protocol for Control plane (GTPv2-C); Stage 3 (3GPP TS 29.274 version 8.2.0 Release 8)", Technical Specification, European Telecommunications Standards Institute (ETSI), 650, Route Des Lucioles; F-06921 Sophia-Antipolis, France, No. V8.2.0, Jun. 1, 2009, XP014044676, 124 pages.

Starent Networks, "Aligning the Parameters in Create Bearer Request Messages for S4 SGSN with 3GPP TS 23.401", 3GPP Draft; REL9_23060_CR962_APN-Restriction Cleanup for S4 SGN, 3rd Generation Partnership Project (3GPP), Mobile Competence Centre; 650, Route Des Lucioles; F-06921, Sophia-Antipolis Cedex, France, No. Kyoto; 20090904, Aug. 20, 2009, XP050396530, 6 pages.

Ericsson et al., "EBI in Downlink Data Notification Message", 3GPP Draft; CA-093585_OLD2907_REL9_EBI_inDDN_P A5, 3rd Generation Partnership Project (3GPP), Mobile Competence Centre; 650, Route Des Lucioles; F-06921 Sophia-Antipolis Cedex, France, No. Beijing; Nov. 9, 2009, XP050387211, 2 pages.

* cited by examiner

SOLUTION FOR PAGING DIFFERENTIATION IN COMMUNICATION NETWORK

CROSS-REFERENCE TO RELATED APPLICATIONS

This application is a 35 U.S.C. §371 National Phase Entry Application from PCT/EP2010/058009, filed Jun. 8, 2010, and designating the United States, and claiming priority to U.S. Provisional Application No. 61/239,300, filed Sep. 2, 2009, the entire contents of said applications are incorporated by reference herein.

TECHNICAL FIELD

The present invention relates to a solution for paging of idle user equipment and in particular for changing mode status from idle to connected in an efficient manner.

BACKGROUND

When the number of subscribers grows in the EPC (Evolved Packet Core) network every optimization possible is needed to fulfil the requirements from the industry.

The suggested way (see for instance 3GPP TS 23.401) to move a user equipment (UE) from EPS Connection Management ECM-IDLE state to ECM-Connected, meaning that the UE can receive downlink payload, is to do this on a UE level, this will make it impossible to initiate different paging procedures on a service level.

Figure 2:
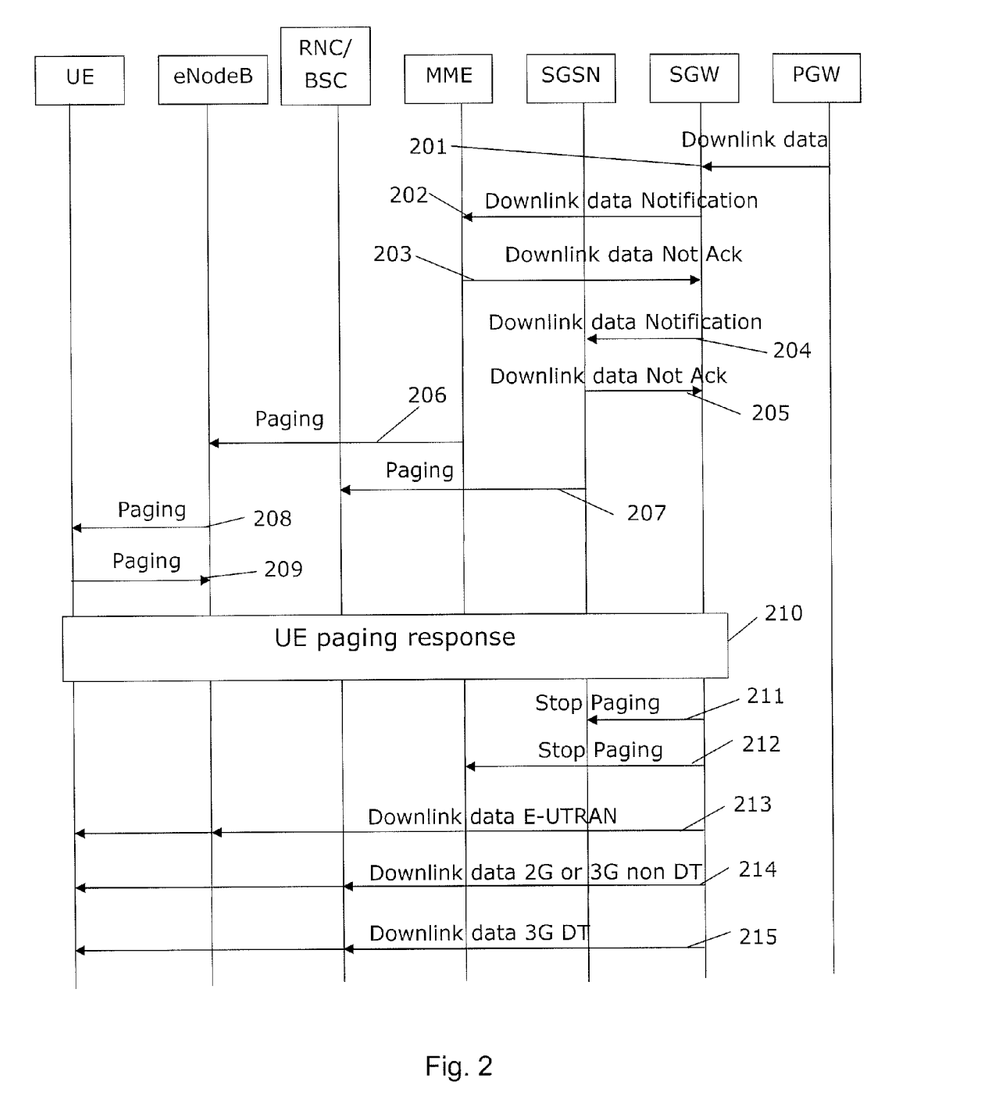
FIG. 2 illustrates schematically in a signaling diagram a method according to the present invention.

From 23.401, v8.5.0 the overall procedure looks like illustrated in FIG. 2.

If a mobility management entity (MME) needs to signal with the UE that it is in ECM-IDLE state, e.g. to perform an MME/HSS-initiated detach procedure for the ECM-IDLE mode UE or a Serving Gateway (SGW) receives control signalling (e.g. Create Dedicated Bearer Request or Modify Dedicated Bearer Request), the MME starts network triggered service request procedure from step 206.

If Idle mode Signalling Reduction (ISR) is activated, when the SGW receives a Create Dedicated Bearer Request or Modify Bearer Request for a UE, and the SGW does not have a downlink S1-U and the SGSN has notified the SGW that the UE has moved to PMM-IDLE or STANDBY state, the SGW buffers signalling messages and triggers MME and SGSN to page UE. In this case the SGW will be notified about the current Radio Access Technology (RAT) type based on the UE triggered service request procedure. The SGW will go on executing the dedicated bearer activation or dedicated bearer modification procedure, i.e. send the corresponding buffered signalling to MME or SGSN which UE resides in now and inform the current RAT type to a Packet Data Network Gateway (PGW) if the RAT type has been changed compared to the last reported RAT Type. If dynamic Policy and Charging Control (PCC) is deployed, the current RAT type information shall also be conveyed from the PGW to a Policy and Charging Rules Function (PCRF). If the PCRF response leads to an EPS bearer modification the PGW should initiate a bearer update procedure.

There are a number of problems with existing solutions, such as it is not possible to initiate different paging procedures for one specific UE or that there will be increased processing load in the MME since the MME has to page rather large areas to be able to secure that the UE is reached.

SUMMARY

It is therefore an object of the present invention to provide solutions that addresses these problems. This is provided in a number of aspects in which a first is a method for handling paging of user equipment communicating wirelessly with a telecommunications network. The method is executed in a mobility management entity (MME) and first the MME receives from a serving gateway a downlink data notification comprising information about at least one bearer identification. Further, the MME determines a paging request based on the bearer identification and a framework table comprising selection criteria entries for access point name, quality of service class indicator, IMSI number, and IMEI number and determines from the framework table a paging granularity set to be used in the paging request from a granularity table comprising entries for paging areas, number of paging retries, and time between retransmissions. Finally, the MME sends the paging request to a radio access network node.

The paging areas may comprise at least one of eNodeB, tracking area, part of tracking area list, and tracking area list and wherein the downlink data notification may indicate that a user equipment state is to be changed from idle mode to connected mode. The downlink data notification may comprise an information element with the bearer identification.

The mobility management node may be at least one of mobility management entity (MME) or a Serving GPRS support node (SGSN).

The framework table may further comprise an allocation and retention priority entry. The radio access network node may be an eNodeB.

Another aspect of the present invention is provided, a mobility management node used in paging procedure of user equipment in a wireless communication network. The node may comprise a processor, a computer readable memory, and a communication interface. The processor may be arranged to execute instruction sets stored in the memory and using the communication interface for receiving from a serving gateway a downlink data notification comprising information about at least one bearer identification, determining a paging request based on a framework table comprising selection criteria entries for access point name, quality of service class indicator, IMSI number, and IMEI number and determining from the framework table a paging granularity set to be used in the paging request from a granularity table comprising entries for paging areas, number of paging retries, and time between retransmissions, and sending the paging request to a radio access network node.

Yet another aspect of the present invention is provided, a computer program stored in a computer readable storage medium in a mobility management entity. The computer program may comprise instruction sets for receiving from a serving gateway a downlink data notification comprising information about at least one bearer identification, determining a paging request based on the bearer identification and a framework table comprising selection criteria entries for access point name, quality of service class indicator, IMSI number, and IMEI number and determining from the framework table a paging granularity set to be used in the paging request from a granularity table comprising entries for paging areas, number of paging retries, and time between retransmissions; and sending the paging request to a radio access network node.

In communication with MME is a serving gateway node used in paging of user equipment in a wireless communication network. The node may comprise a processor, a computer readable memory, a communication interface. The processor may be arranged to execute instruction sets stored in the memory and using the communication interface for determining that a downlink data notification message is to be sent to a mobility management node, providing an identification extension information element in the downlink data notification message, and sending the downlink data notification message to the mobility management node. The identification extension may be an evolved packet system bearer identification. The downlink data notification message may be sent on an S11 interface between the serving gateway node and a mobility management entity, i.e. MME, and/or the downlink data notification message may be sent on an S4 interface between the serving gateway node and a serving GPRS support node, i.e. SGSN.

Furthermore, a system according to the present invention for use in a wireless communication network is provided. The system may comprise an access gateway node handling wireless communication with a user equipment, a mobility management node as described above in communication with the access gateway node; and a serving gateway node as described above in communication with the mobility management node.

With the above mentioned aspects of the present invention it is provided paging differentiation, and this document shows examples of how to implement a solution relating to paging between the MME and a radio network access node, e.g. an eNodeB. The present invention provides two parts in the solution: first a framework is created in the MME handling how each and every UE should be paged depending on different criteria and scenarios and secondly the message protocol between SGW and MME is extended to include information for determining the framework.

This is solved by introducing an information element (IE) with proprietary configuration or to add an extension to the existing IE related to downlink data notification.

With the solution according to the present invention, there are a number of advantages, such as providing flexible paging procedural handling;
possibility to minimize signalling load over air;
possibility to minimize signalling load in network; and
possibility to minimize processing load in the MME

BRIEF DESCRIPTION OF THE DRAWINGS

In the following the invention will be described in a non-limiting way and in more detail with reference to exemplary embodiments illustrated in the enclosed drawings, in which.

DETAILED DESCRIPTION

Figure 1:
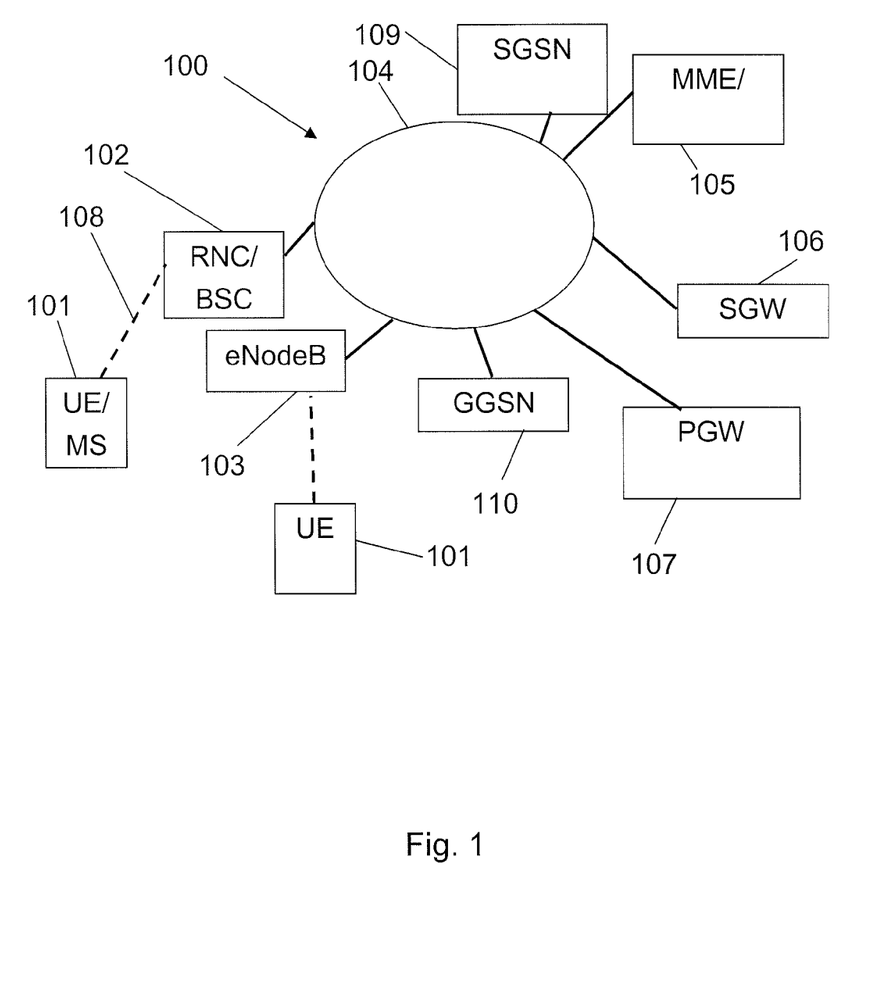
FIG. 1 illustrates schematically a network according to the present invention.

In FIG. 1 reference numeral 100 generally denote a network according to the present invention. An infrastructure network 104 connects infrastructure entities with each other for handling control and data traffic to and from user equipment 101 (UE). The UE may be connected wirelessly to a EUTRAN based network via an eNodeB 103 or wirelessly 108 to a GERAN or UTRAN based network via an RNC/BSC 102. Mobility managing nodes are provided, e.g. mobility management entity (MME) 105 and/or serving GPRS support node (SGSN) 109. Gateway handling nodes are also provided, e.g. GGSN 110 and/or Packet Data Network Gateway 107 (PGW). Furthermore, a Serving Gateway (SGW) 106 may be provided.

FIG. 2 illustrates a signalling flow for moving a UE from idle mode to connected mode. In order to introduce paging differentiation step 206 is addressed as will be discussed later in this document. The flow is as follows:

201. When the SGW receives a downlink data packet for a UE known as not user plane connected (i.e. the SGW context data indicates no downlink user plane Tunnel Endpoint Identifier (TEID)), it buffers the downlink data packet and identifies which MME or SGSN is serving that UE.

If that MME has requested the SGW to delay sending the Downlink (DL) Data Notification (DDN) (see clause 5.3.4.2 on "Handling of abnormal conditions in UE triggered Service Request" in TS 23.401 v9.1.0), the SGW buffers the downlink data and waits until the timer expires before continuing with step 2. If a DL-TEID and eNodeB address for that UE is received before the expiry of the timer, the timer shall be cancelled and the Network triggered Service Request procedure is finished without executing the steps below, i.e. DL data are sent to the UE.

If the SGW receives additional downlink data packets for this UE before the expiry of the timer, the SGW does not restart this timer.

202-205. The SGW sends a Downlink Data Notification message to the MME and SGSN nodes for which it has control plane connectivity for the given UE. The MME and SGSN respond to the SGW with a Downlink Data Notification Acknowledgement (Ack) message.

If the SGW receives additional downlink data packets for this UE, the SGW buffers these downlink data packets and the SGW does not send a new Downlink Data Notification.

206. If the UE is registered in the MME, the MME sends a Paging message (comprising entries for NAS ID for paging, TAI(s), UE identity based DRX (Discontinuous Reception) index, Paging DRX length) to each eNodeB belonging to the tracking area(s) in which the UE is registered. The step is described in detail in TS 36.300 and TS 36.413. Steps 206-209 are omitted if the MME already has a signalling connection over S1-MME towards the UE.

207. If the UE is registered in the SGSN, the SGSN sends paging messages to RNC/BSS, which is described in detail in TS 23.060.

208. If eNodeBs receive paging messages from the MME, the UE is paged by the eNodeBs. The step is described in detail in TS 36.300 and TS 36.304.

209. If RNC/BSS/BSC nodes receive paging messages from the SGSN the UE is paged by the RN(S)C/BSS/BSC, which is described in detail in TS 23.060.

210. Upon reception of paging indication in E-UTRAN access, the UE initiates the UE triggered Service Request procedure, which is specified in clause 5.3.4.1 in TS23.401. Upon reception of paging indication in UTRAN or GERAN access, the UE shall respond in respective access as specified TS 24.008 and the SGSN shall notify the SGW.

The MME and/or SGSN supervise the paging procedure with a timer. If the MME and/or SGSN receive no response from the UE to the Paging Request message, it may repeat the paging. The repetition strategy is operator dependent.

If the MME and/or SGSN receive no response from the UE after this paging repetition procedure, it shall use the Downlink Data Notification Reject message to notify the SGW about the paging failure. In that case, if ISR is not activated, the SGW deletes the buffered packet(s). If ISR is activated and the SGW receives paging failure from both SGSN and MME, the SGW deletes the buffered packet(s) or rejects the control signalling which triggers the Service Request procedure.

211. If ISR is activated and paging response is received in E UTRAN access the SGW sends a "Stop Paging" message to the SGSN.

212. If ISR is activated and paging response is received in UTRAN or GERAN access the SGW sends a "Stop Paging" message to the MME.

213-214. The SGW transmits downlink data towards the UE only via the RAT where paging response was received depending on what configuration is present.

Downlink data may be transferred when mode is changed to connected.

In step 206 above a paging differentiation solution may be provided by first creating a framework in the MME handling how each and every UE should be paged depending on different criteria and scenarios—these selection criteria and scenarios will be discussed below. The MME reacts from an extension in the downlink data notification message from the SGW to the MME—this extension will be discussed in more detail below.

When the MME is informed that downlink data for a UE is waiting for transmittal, a paging message is to be sent downlink towards the UE in order to change the state of the UE from IDLE to CONNECTED. In order to reduce the load on the infrastructure due to paging procedures, a framework may be provided in the MME comprising selection criteria and a wanted paging granularity. The selection criteria may be based on a combination of access point name (APN), Quality of Service (QoS) Class Identifier (QCI), International Mobile Equipment Identity Number Series (IMEINS), and International Mobile Subscriber Identity Number Series (IMSINS). Based on the selection criteria a wanted granularity may be provided, wherein the granularity may comprise a combination of eNodeB (eNB), Tracking Area (TA), part of a TA identifier (TAI) list, and a TAI list. Furthermore, the framework may comprise information about number of retransmissions of and time between retransmissions.

In summary, the framework with, at least, the following criteria may be provided in the MME:
1) Selection Criteria:
comprising APN,
 QCI,
 IMEINS,
 IMSINS
2) Wanted granularity:
comprising eNodeB (evolved NodeB),
 TA (tracking area),
 Part of TAI list (TA Identifier list),
 TAI List.
3) Number of retransmissions
4) Time between retransmissions This will make it possible for the operator to have a flexible way of adapting the paging load in accordance with the current network topology situation.

The configuration of the framework may be done using either CLI (Command Line Interface) or MMI (Man Machine Interface).

The result will be two tables looking for example like this, but it should be appreciated that these are only examples of tables shown for illustrative purposes:

TABLE 1

| APN | QCI | IMSI number Series | IMEI number Series | Granularity Set |
|---|---|---|---|---|
| X | 1-4 | X | X | 1 (see table below) |
| X | 5 | X | X | 2 (see table below) |

TABLE 1-continued

| APN | QCI | IMSI number Series | IMEI number Series | Granularity Set |
|---|---|---|---|---|
| X | 6-9 | X | X | 3 (see table below) |
| X | X | 12345 | X | 4 (see table below) Specially selected subscriber groups. |
| X | X | X | 12345 | 4 (see table below) Used in combination with laptop modems |
| vendor.se | X | X | X | 1 (see table below) |

TABLE 2

| Granularity Set | Area 1 | Area 2 | Area 3 | Area4 | Number of re-tries | Time between areas (s) |
|---|---|---|---|---|---|---|
| 1 | X | X | TA List, TA 1-3) | TAI List | 2 | 1 |
| 2 | X | TA | TA List, TA 1-3) | TAI List | 1 | 2 |
| 3 | eNB | TA | TA List, TA 1-3) | TAI List | 1 | 2 |
| 4 | eNB | TA | X | X | 2 | 1 |

To make this possible, information is to be sent from SGW to MME to provide the MME with information to handle the situation correctly, and there are two possible ways to do this, either 1. a proprietary solution for a vendor/operator using the private extension (see message below); or to
2. update the standard message in 3GPP TS 29.274.

Downlink Data Notification message is described in 3GPP TS 29.274. A Downlink Data Notification message shall be sent on the S11 interface by the SGW to the MME as a part of the network triggered service request procedure.

The message shall also be sent on the S4 interface by the SGW to the SGSN as part of Paging with no established user plane on S4, SGW triggered paging with S4.

Table 3 below specifies the presence of the IEs in the message.

TABLE 3

Information Elements in a Downlink Data Notification

| Information elements | P | Condition/Comment | IE Type | Ins. |
|---|---|---|---|---|
| Private Extension | O | | Private Extension | VS |

Solution 1 is to use an already present information element (IE) Private Extension. However, this only works for a single vendor network. A single vendor network comprises nodes delivered by a single vendor, i.e. all nodes are made by the same vendor and therefore may work with proprietary interfaces and solutions if so wanted.

Solution 2 is to add an IE to the downlink data notification message, which thus may look like this:

TABLE 4

| Information elements | P | Condition/Comment | IE Type | Ins. |
|---|---|---|---|---|
| EPS Bearer ID | O | This IE shall contain the bearer that SGW has received downlink payload for. | EBI | 0 |
| Private Extension | O | | Private Extension | VS |

In this second solution a separate EPS bearer ID information element is used to signal that the SGW has received downlink payload for the UE and that the mode of the UE is to be changed. Solution 2 makes it possible to use in an all vendor network.

Figure 3:
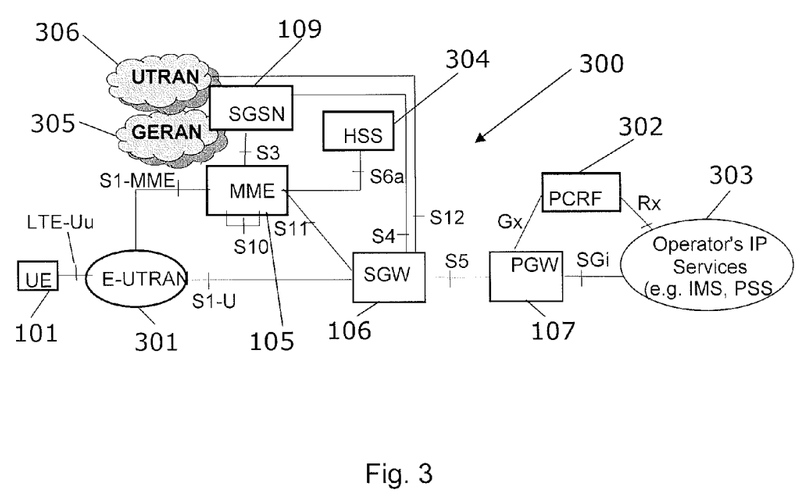
FIG. 3 illustrates schematically a network architecture with interfaces according to the present invention.

The solution according to the present invention may be provided in a 3GPP based network 300 as depicted in FIG. 3. The 3GPP network may comprise a core network part and an E-UTRAN access network part 301. The core network part may comprise a mobility management entity (MME) 105, a serving gateway (SGW) 106, a packet data network gateway (PGW) 107, a policy and charging rules function node (PCRF) 302, and a home subscriber server (HSS) 304. The MME is in communication with the access network 301 via an S1-MME interface, a serving GPRS support node (SGSN) 109 via an S3 interface, the HSS via an S6a interface, and the SGW via an S11 interface. The SGW is in turn connected to the access network 301 via an S1-U interface, the SGSN via an S4 interface, and the PGW via an S5 interface. Furthermore, the SGW is connected to a UTRAN based access network 306. The SGSN 109 is also connected to the UTRAN based access network and to a GERAN based access network 305. The PGW is connected to the PCRF via a Gx interface and each of the PGW and the PCRF is connected to an Operators IP services via SGi and Rx interfaces respectively. The operators IP services may comprise e.g. IMS and PSS. The UE 101 is connected to the E-UTRAN access network via an LTE-Uu interface.

Figure 4:
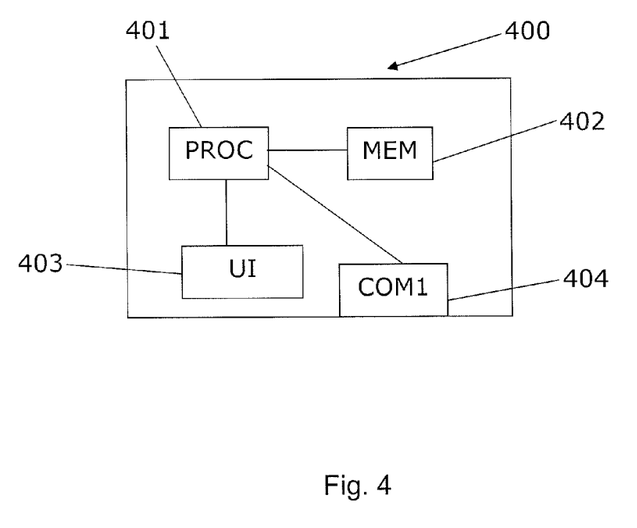
FIG. 4 illustrates schematically a device according to the present invention.

The solution according to the present invention involves core network nodes 400, e.g. the MME, as illustrated in FIG. 4, which comprise a processor 401, a computer readable storage medium 402, and at least one communication interface 404. Optionally, the node 400 also comprises a user interface 403. The processor is arranged to execute instruction sets of computer software code, stored in the memory, for handling steps according to the present invention: e.g. handling the information element used for paging purposes. The invention also involves a mobility management node, e.g. SGW or SGSN, which comprise similar units, i.e. at least one processor, memory, and communication interface—FIG. 4 may be reused for illustrating these nodes as they are built with such similar components. The SGW provides a message comprising information about the location of the UE. This message is provided as part of the paging process and is transmitted in the network as a signal. The infrastructure network further comprises other network nodes as high level nodes as for instance shown in FIGS. 1 and 3; furthermore, the network may comprise basic network routing and switching elements for transmitting control and data traffic in the network.

In short, a method facilitating changing mode of user equipment in a wireless communication network may be summarized as follows: The method comprising the steps of:

determining if a mode of a user equipment, i.e. UE, is to be changed from idle mode to connected mode;
providing a message used in a paging process in a core network node;
providing in the message an information element, i.e. IE, comprising information related to location of UE in the communication network; the location information is used for executing a paging process.

The references mentioned in this document are incorporated into this document by reference.

It should be noted that with computer program is meant any type of instruction sets that may be executed by a processor. It may be software instruction sets or hardware instruction sets depending on type of processing device, e.g. microprocessor, CPU, FPGA (field programmable gate array), ASIC (application specific integrated circuit), or similar devices.

With computer readable storage medium is meant any type of storage medium accessible by a processing device, and the storage medium may be of volatile and/or non-volatile type.

It should be noted that the word "comprising" does not exclude the presence of other elements or steps than those listed and the words "a" or "an" preceding an element do not exclude the presence of a plurality of such elements. It should further be noted that any reference signs do not limit the scope of the claims, that the invention may be at least in part implemented by means of both hardware and software, and that several "means" or "units" may be represented by the same item of hardware.

Modifications and other embodiments of the disclosed invention(s) will come to mind to one skilled in the art having the benefit of the teachings present in the foregoing descriptions and the associated drawings. Therefore, it is to be understood that the invention(s) is/are not to be limited to the specific embodiments disclosed and that modifications and other embodiments are intended to be included within the scope of this disclosure. Although specific terms may be employed herein, they are used in a generic and descriptive sense only and not for purpose of limitation.

The above mentioned and described embodiments are only given as examples and should not be limiting to the present invention. Other solutions, uses, objectives, and functions within the scope of the invention as exemplified in the below described embodiments should be apparent for the person skilled in the art.

ABBREVIATIONS

| | |
|---|---|
| APN | Access Point Name |
| APN-NI | Access Point Name Network Identifier |
| APN-OI | Access Point Name Operator Identifier |
| ARP | Allocation and Retention Priority |
| BSC | Base station controller |
| BS | Base station |
| BSS | Base station system |
| CLI | Command Line Interface |
| CPU | Central Processing Unit |
| CSG ID | Closed Subscriber Group Identity |
| CSG | Closed Subscriber Group |
| DB | Data Base |
| EBI | EPS Bearer ID |
| ECGI | E-UTRAN Cell Global Identifier |
| ECM | EPS Connection Management |
| EDGE | Enhanced Data rates for GSM Evolution |
| EMM | EPS Mobility Management |
| eNB | Evolved NodeB |
| eNodeB | Evolved Node B |
| EPC | Evolved Packet Core |
| EPS | Evolved Packet System |
| E-RAB | E-UTRAN Radio Access Bearer |

-continued

ABBREVIATIONS

| | |
|---|---|
| E-UTRAN | Evolved Universal Terrestrial Radio Access Network |
| GERAN | GSM/EDGE Radio Access Network |
| G-PDU | GTP-U non-signalling PDU |
| GPRS | General Packet Radio Service |
| GSM | Global System for Mobile communications |
| GTP | GPRS Tunnelling Protocol |
| GUMMEI | Globally Unique MME Identifier |
| GUTI | Globally Unique Temporary Identity |
| GW | Gateway |
| HSS | Home subscriber server |
| IEEE | Institute of Electrical and Electronics Engineers |
| IMEINS | International Mobile Equipment Identity Number Series |
| IMSI | International Mobile Subscriber Identity |
| IMSINS | International Mobile Subscriber Identity Number Series |
| IP | Internet Protocol |
| ISR | Idle mode Signalling Reduction |
| LTE | Long Term Evolution |
| MBR | Maximum Bit Rate |
| MEI | Mobile Equipment Identity |
| MME | Mobility Management Entity |
| MMEC | MME Code |
| MMI | Man Machine Interface |
| MSISDN | Mobile Subscriber ISDN Number |
| NAK | Negative AcKnowledgement |
| NAS | Non Access Stratum |
| PCC | Policy and Charging Control |
| PCRF | Policy and Charging Rules Function |
| PDCP | Packet Data Convergence Protocol |
| PDN | Packet Data Network or Public Data Network |
| PDN-GW | Packet Data Network GateWay |
| PDU | Protocol Data Unit |
| PGW | PDN Gateway |
| PMIP | Proxy Mobile IP |
| QCI | QoS Class Identifier |
| QoS | Quality of Service |
| RAT | Radio Access Technology/Type |
| RCI | RAT Connection Information |
| RIM | RAN Information Management |
| RNC | Radio network controller |
| RNS | Radio network system |
| Rx | Reception |
| SGSN | Serving GPRS Support Node |
| SGW | Serving Gateway |
| S-TMSI | S-Temporary Mobile Subscriber Identity |
| TA | Tracking Area |
| TAC | Tracking Area Code |
| TAD | Traffic Aggregate Description |
| TAI | Tracking Area Identity |
| TAU | Tracking Area Update |
| TEID | Tunnel Endpoint Identifier |
| TEID-C | Tunnel Endpoint Identifier, control plane |
| TEID-U | Tunnel Endpoint Identifier, user plane |
| TFT | Traffic Flow Template |
| Tx | Transmission |
| UDP | User Datagram Protocol |
| UE | User Equipment |
| UL TFT | UpLink Traffic Flow Template |
| UTRAN | Universal Terrestrial Radio Access Network |
| W-CDMA | Wideband Code Division Multiple Access |

REFERENCES AND DEFINITIONS

3GPP TS23.401

MME Pool Area: An MME Pool Area is defined as an area within which a UE may be served without need to change the serving MME. An MME Pool Area is served by one or more MMEs ("pool of MMEs") in parallel. MME Pool Areas are a collection of complete Tracking Areas. MME Pool Areas may overlap each other.

SGW Service Area: A SGW Service Area is defined as an area within which a UE may be served without need to change the SGW. A SGW Service Area is served by one or more SGWs in parallel. SGW Service Areas are a collection of complete Tracking Areas. SGW Service Areas may overlap each other.

PDN Connection: The association between a UE represented by one IPv4 address and/or one IPv6 prefix and a PDN represented by an APN.

Default Bearer: The EPS bearer which is first established for a new PDN connection and remains established throughout the lifetime of the PDN connection.

Default APN: A Default APN is defined as the APN which is marked as default in the subscription data and used during the Attach procedure and the UE requested PDN connectivity procedure when no APN is provided by the UE.

EPS Mobility Management and Connection Management states

The EPS Mobility Management (EMM) states describe the Mobility Management states that result from the mobility management procedures e.g. Attach and Tracking Area Update procedures.

Two EMM states are described in this document:
EMM-DEREGISTERED.
EMM-REGISTERED.

In the EMM DEREGISTERED state, the EMM context in MME holds no valid location or routeing information for the UE. The UE is not reachable by a MME, as the UE location is not known.

In the EMM-DEREGISTERED state, some UE context can still be stored in the UE and MME, e.g. to avoid running an AKA procedure during every Attach procedure. The UE enters the EMM-REGISTERED state by a successful registration with an Attach procedure to either E-UTRAN or GERAN/UTRAN. The MME enters the EMM-REGISTERED state by a successful Tracking Area Update procedure for a UE selecting an E-UTRAN cell from GERAN/UTRAN or by an Attach procedure via E-UTRAN. In the EMM-REGISTERED state, the UE can receive services that require registration in the EPS.

A UE is in ECM-IDLE state when no NAS signalling connection between UE and network exists.

In ECM-CONNECTED mode, the UE location is known in the MME with an accuracy of a serving eNodeB ID. The mobility of UE is handled by the handover procedure.

The UE performs the tracking area update procedure when the TAI in the EMM system information is not in the list of TA's that the UE registered with the network, or when the UE handovers to an E UTRAN cell and the UE's TIN indicates "P-TMSI".

For a UE in the ECM-CONNECTED state, there exists a signalling connection between the UE and the MME. The signalling connection is made up of two parts: an RRC connection and an S1_MME connection.

The UE shall enter the ECM-IDLE state when its signalling connection to the MME has been released or broken. This release or failure is explicitly indicated by the eNodeB to the UE or detected by the UE.

The S1 release procedure changes the state at both UE and MME from ECM-CONNECTED to ECM-IDLE.

3GPP TS 29.274

The invention claimed is:

1. A method performed by a network node for implementing paging differentiation, the method comprising:

the network node mapping a first set of values with a first paging granularity set of values, wherein (A) the first set of values comprises: an access point name, a quality of service class identifier (QCI), an international mobile subscriber identity number series (IMSINS), and an international mobile equipment identity number series (IMEINS); and (B) the first paging granularity set of values comprises two or more of: a base station (eNB)

identifier, a tracking area, at least a portion of a tracking area identifier list, and a number of retries value;

the network node mapping a second set of values with a second paging granularity set of values, wherein: (A) the second set of values comprises: an access point name, a QCI, an IMSINS, and an IMEINS; and (B) the second paging granularity set of values comprises two or more of: a base station (eNB) identifier, a tracking area, at least a portion of a tracking area identifier list, and a number of retries value;

the network node receiving a downlink data notification (DDN) message comprising a bearer identifier; and in response to receiving the DDN message, the network node:

(i) using the bearer identifier to determine a third set of values corresponding with the bearer identifier, the third set of values comprising: an access point name, a QCI, an IMSINS, and an IMEINS; and (ii) using the third set of values to select a paging granularity set of values, wherein the selected paging granularity set of values comprises two or more of: a base station (eNB) identifier, a tracking area, at least a portion of a tracking area identifier list, and a number of retries value.

2. The method of claim 1, wherein the network node is a mobility management entity (MME) and the bearer identifier is an evolved packet system (EPS) bearer identifier.

3. The method of claim 1, wherein the step of mapping the first set of values with the first paging granularity set of values comprises storing in a database record the first set of values and an identifier mapped to the first paging granularity set of values.

4. A network node apparatus for implementing paging differentiation, the network node apparatus being configured to:

map a first set of values with a first paging granularity set of values, wherein (A) the first set of values comprises: an access point name, a quality of service class identifier (QCI), an international mobile subscriber identity number series (IMSINS), and an international mobile equipment identity number series (IMEINS); and (B) the first paging granularity set of values comprises two or more of: a base station (eNB) identifier, a tracking area, at least a portion of a tracking area identifier list, and a number of retries value; and map a second set of values with a second paging granularity set of values, wherein: (A) the second set of values comprises: an access point name, a QCI, an IMSINS, and an IMEINS; and (B) the second paging granularity set of values comprises two or more of: a base station (eNB) identifier, a tracking area, at least a portion of a tracking area identifier list, and a number of retries value, wherein the network node apparatus is further configured to performs steps (i) and (ii) below in response to receiving a downlink data notification (DDN) message comprising a bearer identifier:

(i) using the bearer identifier to determine a third set of values corresponding with the bearer identifier, the third set of values comprising: an access point name, a QCI, an IMSINS, and an IMEINS; and (ii) using the third set of values to select a paging granularity set of values, wherein the selected paging granularity set of values comprises two or more of: a base station (eNB) identifier, a tracking area, at least a portion of a tracking area identifier list, and a number of retries value.

5. The network node apparatus of claim 4, wherein the network node apparatus comprise a Mobility Management Entity (MME) and the bearer identifier is an evolved packet system (EPS) bearer identifier.

6. The network node apparatus of claim 4, wherein the network node apparatus is configured to map the first set of values with the first paging granularity set of values by storing in a database record the first set of values and an identifier mapped to the first paging granularity set of values.

7. A computer program product comprising a non-transitory computer readable storage medium and a computer program stored in the computer readable storage medium, the computer program comprising instructions for:

mapping a first set of values with a first paging granularity set of values, wherein (A) the first set of values comprises: an access point name, a quality of service class identifier (QCI), an international mobile subscriber identity number series (IMSINS), and an international mobile equipment identity number series (IMEINS); and (B) the first paging granularity set of values comprises two or more of: a base station (eNB) identifier, a tracking area, at least a portion of a tracking area identifier list, and a number of retries value; and mapping a second set of values with a second paging granularity set of values, wherein: (A) the second set of values comprises: an access point name, a QCI, an IMSINS, and an IMEINS; and (B) the second paging granularity set of values comprises two or more of: a base station (eNB) identifier, a tracking area, at least a portion of a tracking area identifier list, and a number of retries value, wherein the computer program further comprises instructions for performing steps (i) and (ii) below in response to receipt of a downlink data notification (DDN) message comprising a bearer identifier:

(i) using the bearer identifier to determine a third set of values corresponding with the bearer identifier, the third set of values comprising: an access point name, a QCI, an IMSINS, and an IMEINS; and (ii) using the third set of values to select a paging granularity set of values, wherein the selected paging granularity set of values comprises two or more of a base station (eNB) identifier, a tracking area, at least a portion of a tracking area identifier list, and a number of retries value.

8. The computer program product of claim 7, wherein the bearer identifier is an evolved packet system (EPS) bearer identifier.

9. The computer program product of claim 7, wherein the instructions for mapping the first set of values with the first paging granularity set of values comprises instructions for storing in a database record the first set of values and an identifier mapped to the first paging granularity set of values.

* * * * *

UNITED STATES PATENT AND TRADEMARK OFFICE
CERTIFICATE OF CORRECTION

PATENT NO.        : 8,515,465 B2                                    Page 1 of 1
APPLICATION NO.   : 13/393736
DATED             : August 20, 2013
INVENTOR(S)       : Olsson et al.

It is certified that error appears in the above-identified patent and that said Letters Patent is hereby corrected as shown below:

On the Title Page, Item (56), under "OTHER PUBLICATIONS", in Column 2, Line 1, delete "Radion" and insert -- Radio --, therefor.

In the Specifications

In Column 3, Line 37, delete "MME" and insert -- MME. --, therefor.

In Column 3, Line 51, delete "invention;" and insert -- invention. --, therefor.

In the Claims

In Column 12, Line 49, in Claim 7, delete "more of" and insert -- more of: --, therefor.

Signed and Sealed this
Fifteenth Day of April, 2014

Michelle K. Lee
*Deputy Director of the United States Patent and Trademark Office*